US011574371B1

(12) United States Patent
Hosseini et al.

(10) Patent No.: US 11,574,371 B1
(45) Date of Patent: Feb. 7, 2023

(54) GENERATING PERSONALIZED CONTENT

(71) Applicant: Pinterest, Inc., San Francisco, CA (US)

(72) Inventors: Farid Hosseini, San Francisco, CA (US); Salil Shah, San Francisco, CA (US)

(73) Assignee: Pinterest, Inc., San Francisco, CA (US)

( * ) Notice: Subject to any disclaimer, the term of this patent is extended or adjusted under 35 U.S.C. 154(b) by 215 days.

(21) Appl. No.: 15/835,158

(22) Filed: Dec. 7, 2017

(51) Int. Cl.
*G06Q 30/00* (2012.01)
*G06Q 50/00* (2012.01)
*G06Q 30/02* (2012.01)

(52) U.S. Cl.
CPC ......... *G06Q 50/01* (2013.01); *G06Q 30/0255* (2013.01); *G06Q 30/0269* (2013.01)

(58) Field of Classification Search
CPC ............... G06Q 30/0218; G06Q 50/01; G06Q 30/0255; G06Q 30/0269; G06F 16/9535
USPC .................. 705/14.41, 14.49, 14.2
See application file for complete search history.

(56) References Cited

U.S. PATENT DOCUMENTS

| | | | | |
|---|---|---|---|---|
| 2009/0006285 A1* | 1/2009 | Meek | ..................... | G06Q 10/10 707/999.1 |
| 2009/0083142 A1* | 3/2009 | Keswani | .............. | G06Q 10/107 705/14.36 |
| 2009/0150365 A1* | 6/2009 | Chow | .................. | G06F 16/9535 |
| 2010/0100370 A1* | 4/2010 | Khouri | ................. | G06Q 10/107 704/9 |
| 2013/0198030 A1* | 8/2013 | Linden | ............... | G06Q 30/0256 705/26.7 |
| 2013/0290339 A1* | 10/2013 | LuVogt | ................. | G06Q 10/10 707/740 |
| 2019/0028509 A1* | 1/2019 | Cidon | ..................... | H04L 51/32 |

OTHER PUBLICATIONS

H. Hong and T.-S. Moh, "Effective topic modeling for email," 2015 International Conference on High Performance Computing & Simulation (HPCS), 2015, pp. 342-349, doi: 10.1109/HPCSim.2015.7237060. (Year: 2015).*
V. T. Babu, K. K. Dhara and V. Krishnaswamy, "Augmenting topic models with user relations in context based communication services," 2011 Third International Conference on Communication Systems and Networks (COMSNETS 2011), 2011, pp. 1-10, doi: 10.1109/COMSNETS.2011.5716478. (Year: 2011).*
R. Miller and E. Y. A. Charles, "A psychological based analysis of marketing email subject lines," 2016 Sixteenth International Conference on Advances in ICT for Emerging Regions (ICTer), 2016, pp. 58-65, doi: 10.1109/ICTER.2016.7829899. (Year: 2016).*

(Continued)

*Primary Examiner* — Sun M Li
(74) *Attorney, Agent, or Firm* — Athorus, PLLC

(57) ABSTRACT

Systems and methods are presented for adding system-identified content to a user's content space based on information identified from the user's email account. In operation, after obtaining user authorization to access email items of an email account, the email items are iteratively processed. In processing each of the email items, one or more topics of a currently processed email item are identified. Based on the identified topics and user preferences, one or more content items may be identified for addition to the user's online content space. Additionally, the information identified from processing the one or more email items is used to update the user's preferences.

20 Claims, 8 Drawing Sheets

(56) References Cited

OTHER PUBLICATIONS

Gmail Inbox, E-mail from Google, https://www.google.com/gmail/about/ (downloaded Jan. 1, 2017, by web.archive.org).
Rakuten Slice, Automatic Package Tracker App, 2017, https://www.slice.com/ (downloaded Jan. 5, 2017, by web.archive.org).

* cited by examiner

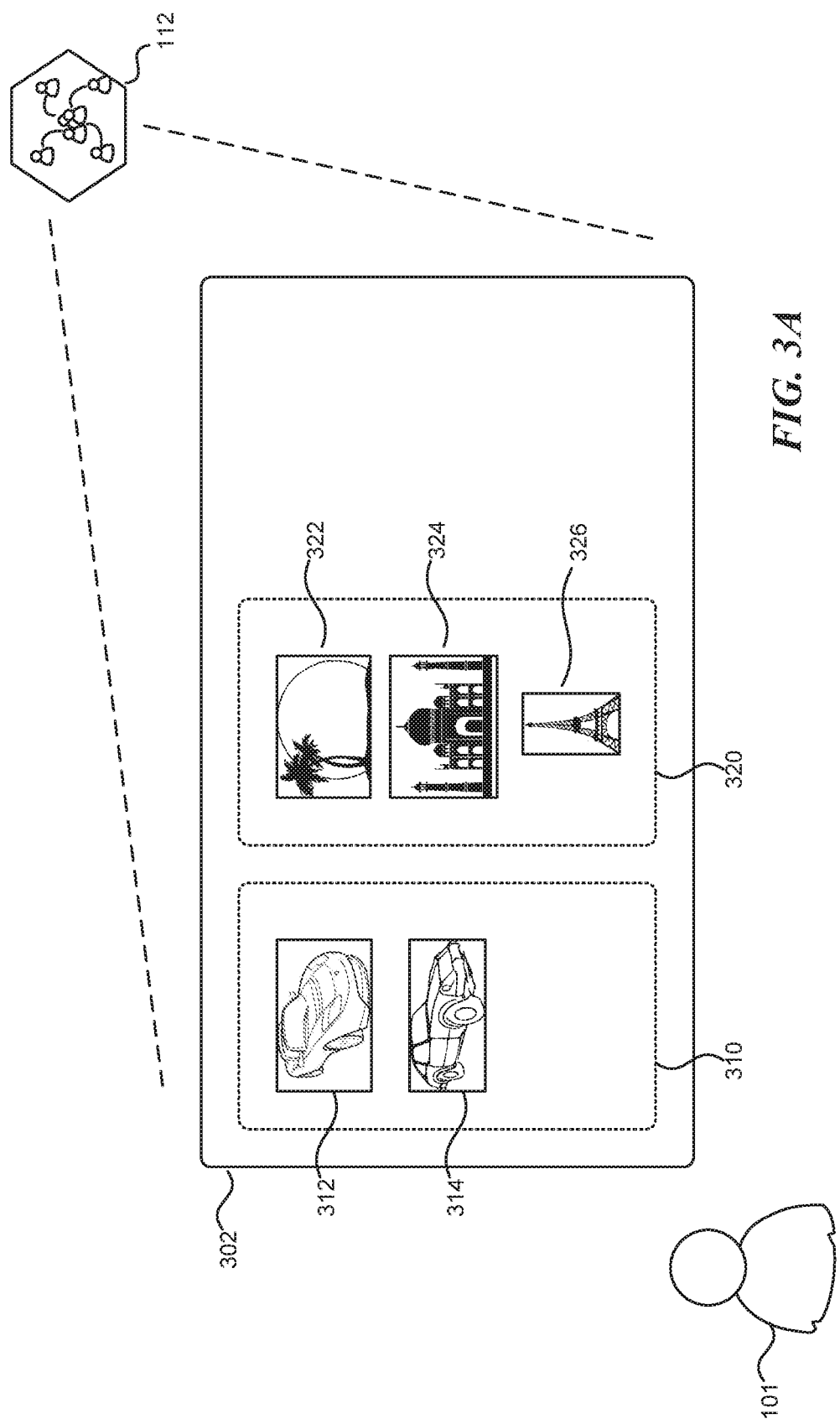

GENERATING PERSONALIZED CONTENT

BACKGROUND

There are numerous social networking services, each offering a particular set of services. Many people are subscribers of multiple social networking services chosen according to the particular set of services that they wish to access and enjoy, as well as those of friends and associates.

Social networking services often look to improve their customer/user experiences through personalization, i.e., customizing the information presented to a user according to a set of user preferences of that user. In this regard, user preferences are maintained for multiple users/subscribers by a social networking service. These user preferences may be established according to explicitly provided information from the user (e.g., the user tells the service what is liked or not), or implicitly derived information about the user based on user behavior with the social networking service (e.g., inferring preferences and dislikes according to the user's behavior).

As mentioned above, each social networking service provides a distinct set of services to the user than those of other social networking services. Since each social networking service provides a distinct set of services, it follows that each social networking service develops a distinct set of user preferences or user information, especially in regard to implicitly derived information based on user behaviors. Social networking services, however, typically do not share personal information of any given user, especially with other social networking services. Of course, one reason for not sharing user preferences may be privacy concerns. Indeed, what a social networking service may learn about a subscriber is often considered sensitive information. On the other hand, another reason for not sharing user preferences data is competition: each social networking service is in competition with one another for a finite amount of a user's attention. The result is that one social networking service may have a particular set of information regarding a user's preference that other services may not possess or know. For example, one social networking service may have substantial user preference information in regard to a user's preference for travel, while another service may hold information regarding that same user's preference to hobbies.

BRIEF DESCRIPTION OF THE DRAWINGS

The foregoing aspects and many of the attendant advantages of the disclosed subject matter will become more readily appreciated as they are better understood by reference to the following description when taken in conjunction with the following drawings, wherein:

FIGS. 3A-3C are pictorial diagrams illustrating exemplary content in a user's content space, and updated with additional content based on discovered information from the user's email account, according to various aspects of the disclosed subject matter;

DETAILED DESCRIPTION

Figure 1:
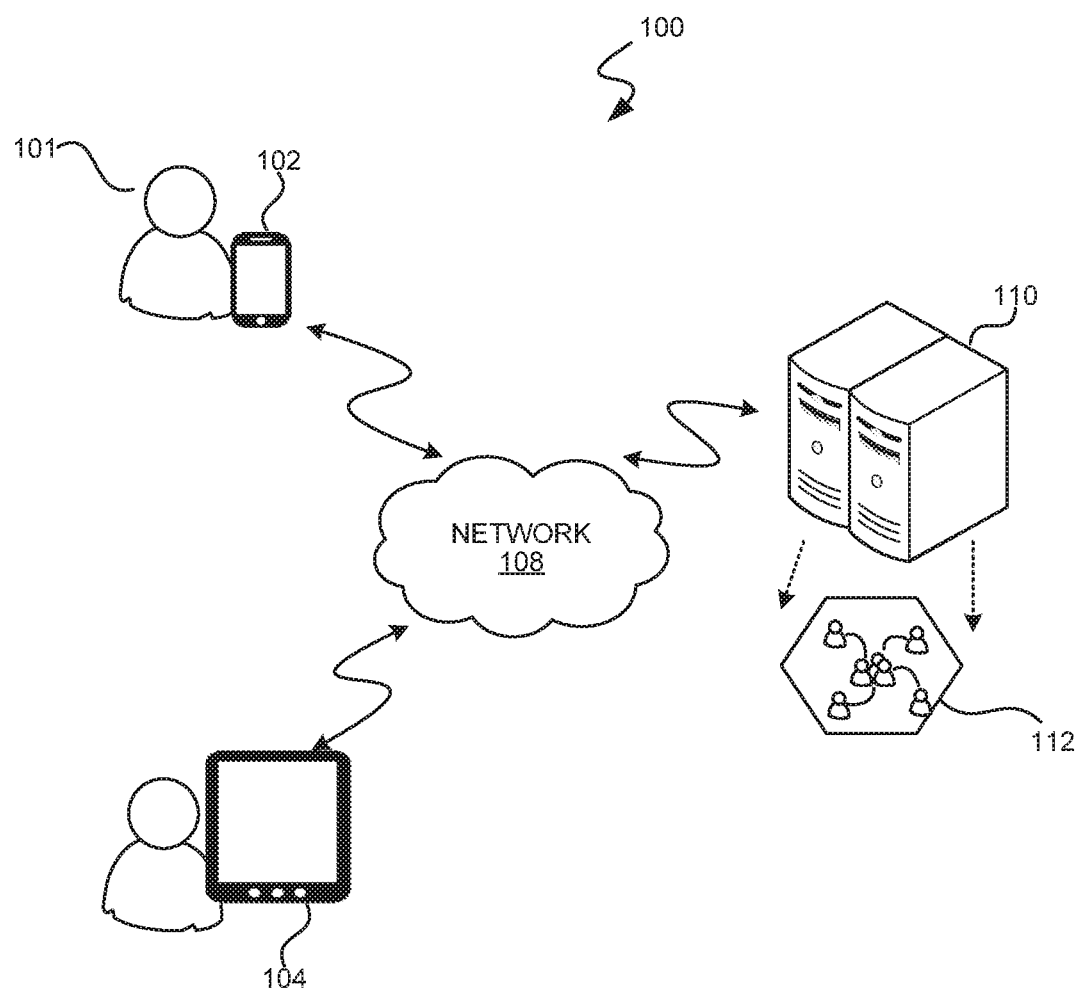
FIG. 1 is a block diagram illustrating an exemplary network environment suitable for implementing aspects of the disclosed subject matter.

According to aspects of the disclosed subject matter, as user preferences of one social networking service are not available or accessible to another social networking service, novel methods and systems are presented herein for obtaining user information (that may include or lead to the inference of user preferences) and utilizing that newly-discovered user information to auto-generate content for the user. Indeed, while social networking services would like for all users to spend all of their time engaged solely with their site, the reality is users do not typically limit themselves in this manner. To reach out to their users when they are not engaged with their service, social networking services often communicate with users through the user's email account. For example, when a social networking service detects action in an area of interest to one of its users, the service will often send an email notification to that user telling him/her of the action and that he/she may be interested. Alternatively, when a person makes a purchase from an online service, an electronic receipt is typically sent to that person's email account. This purchase, of course, may be the source of deriving an implicit user preference of the user. Indeed, the user's email account typically includes a wealth of information about the user that, if accessed and analyzed, can lead to improved understanding of the user as well as the generation of content for the user.

For purposes of clarity and by way of definition, the term "exemplary," as used in this document, should be interpreted as serving as an illustration or example of something, and it should not be interpreted as an ideal or leading illustration of that thing. Stylistically, when a word or term is followed by "(s)", the meaning should be interpreted as indicating the singular or the plural form of the word or term, depending on whether there is one instance of the term/item or whether there is one or multiple instances of the term/item. For example, the term "user(s)" should be interpreted as one or more users. Moreover, the use of the combination "and/or" with regard to multiple items should be viewed as meaning either or both items.

By way of definition and description, a social networking service (also referred to as a social networking site) is an online platform (i.e., network accessible platform or service) to build or establish social networks and/or social relations among computer users. These social networks and/or relationships are often, though not exclusively, based on subscribers/users who share similar interests, activities, backgrounds or real-life connections. A social networking service typically creates an online representation for each user/subscriber, allows its users to establish their social links and networks (relationships with others), and also allows its users to post content to an online content space corresponding to the user or that of other users. Typically, though not exclusively, posted content in a user's online content space may be viewed by others, including those within the user's social network, though a posting user is often able to control who, if anyone, is able to view the posted content.

Regarding the user's online content space and according to aspects of the disclosed subject matter, this online content space is often organized according to one or more collections of related content. By way of illustration and not limitation, the various embodiments of this collection of content may be referred to as boards, pages, threads, collections, and the like. While described in further detail below, reference is made to FIG. 3A, illustrating a user's 101 content space 302 that includes content collections 310 and 320 corresponding to fancy cars and travel, respectively. Typically, though not exclusively, content collections are presented to a user in such a way as to be distinct from each other. Often, but not exclusively, content collections are related to a topic or set of related topics.

Figure 2:
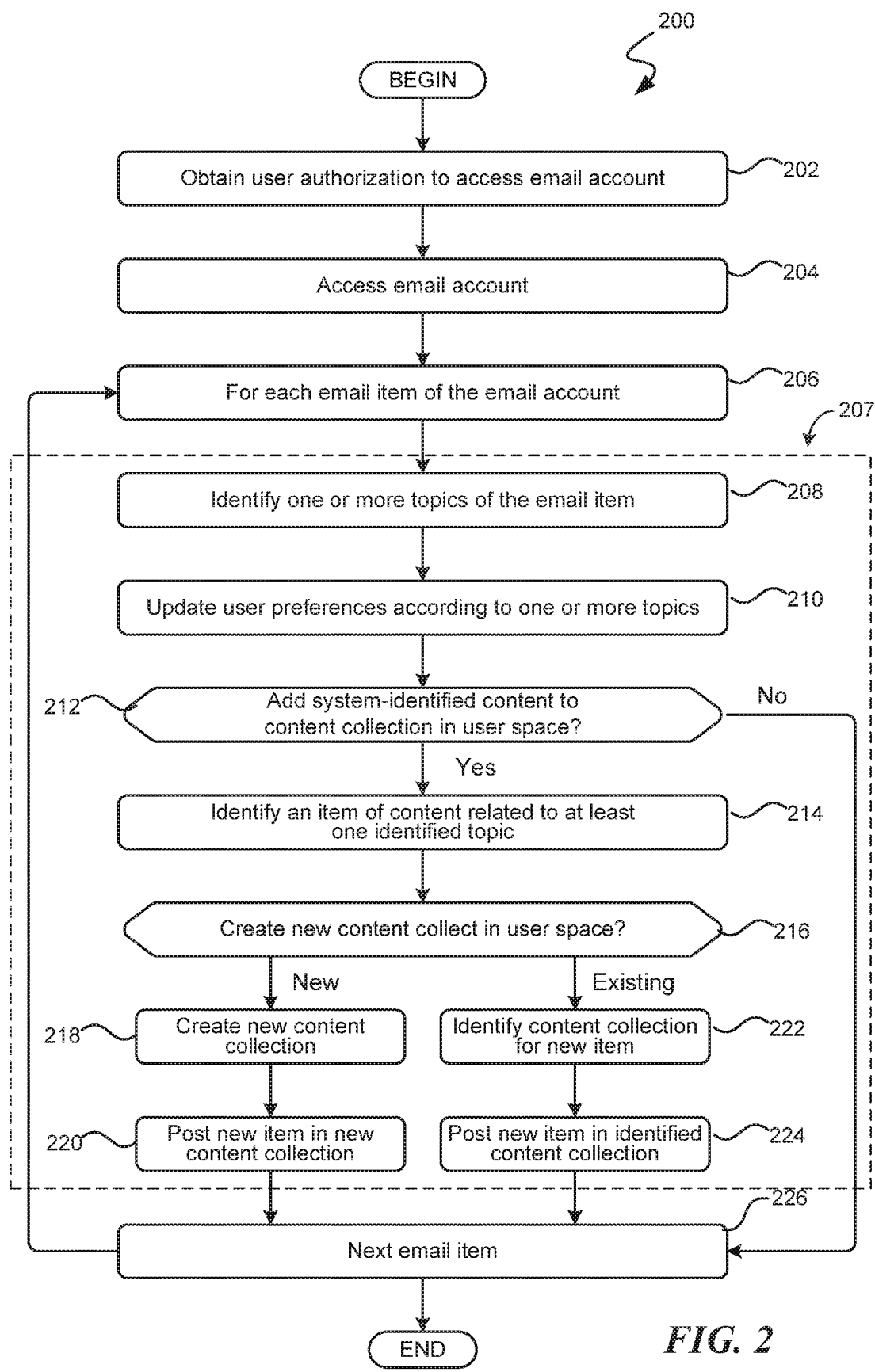
FIG. 2 is a flow diagram illustrating an exemplary routine for generating additional content for a user in the user's content space based on discovered information from the user's email account, according to aspects of the disclosed subject matter.
Figure 3B:
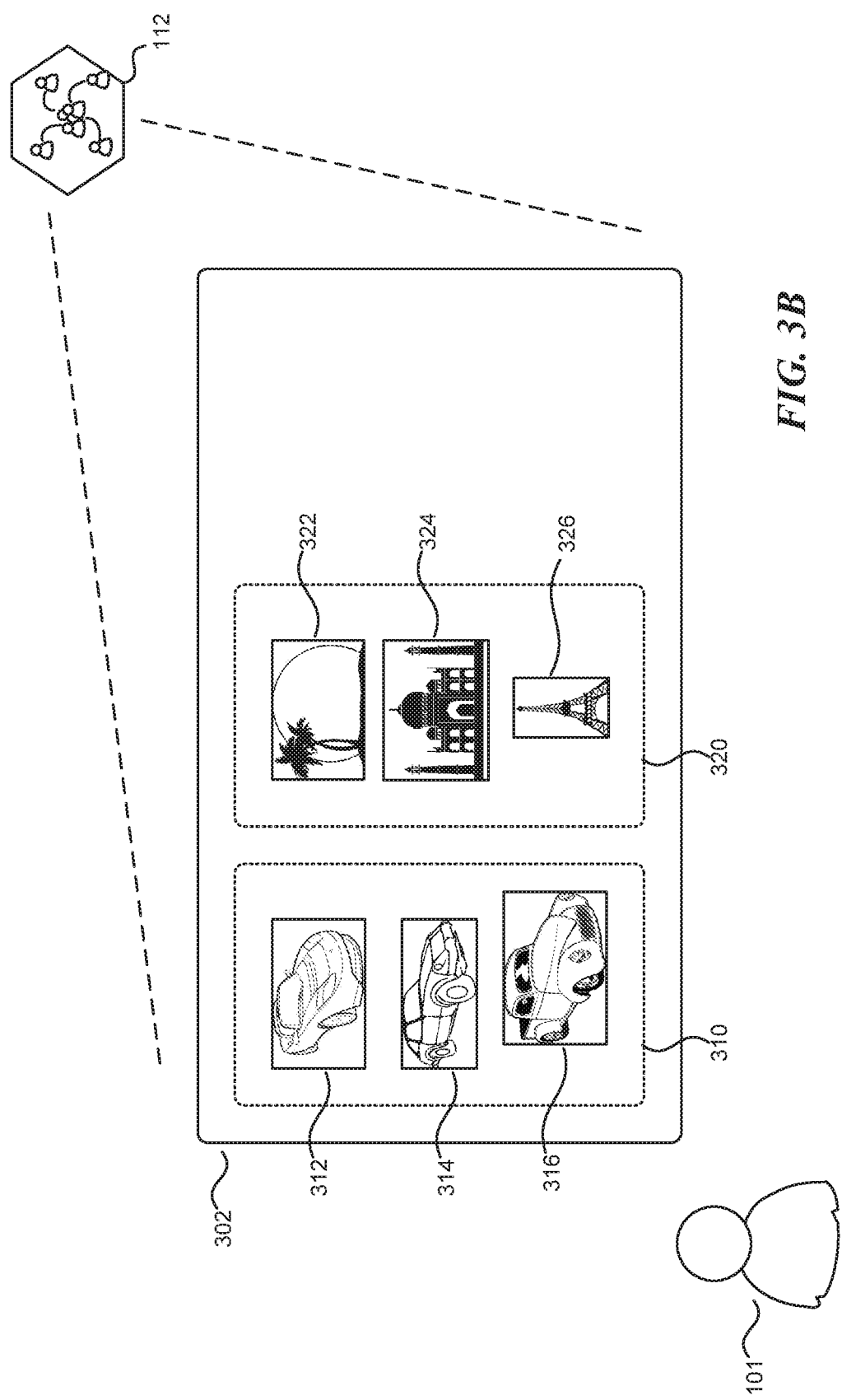
Figure 3C:
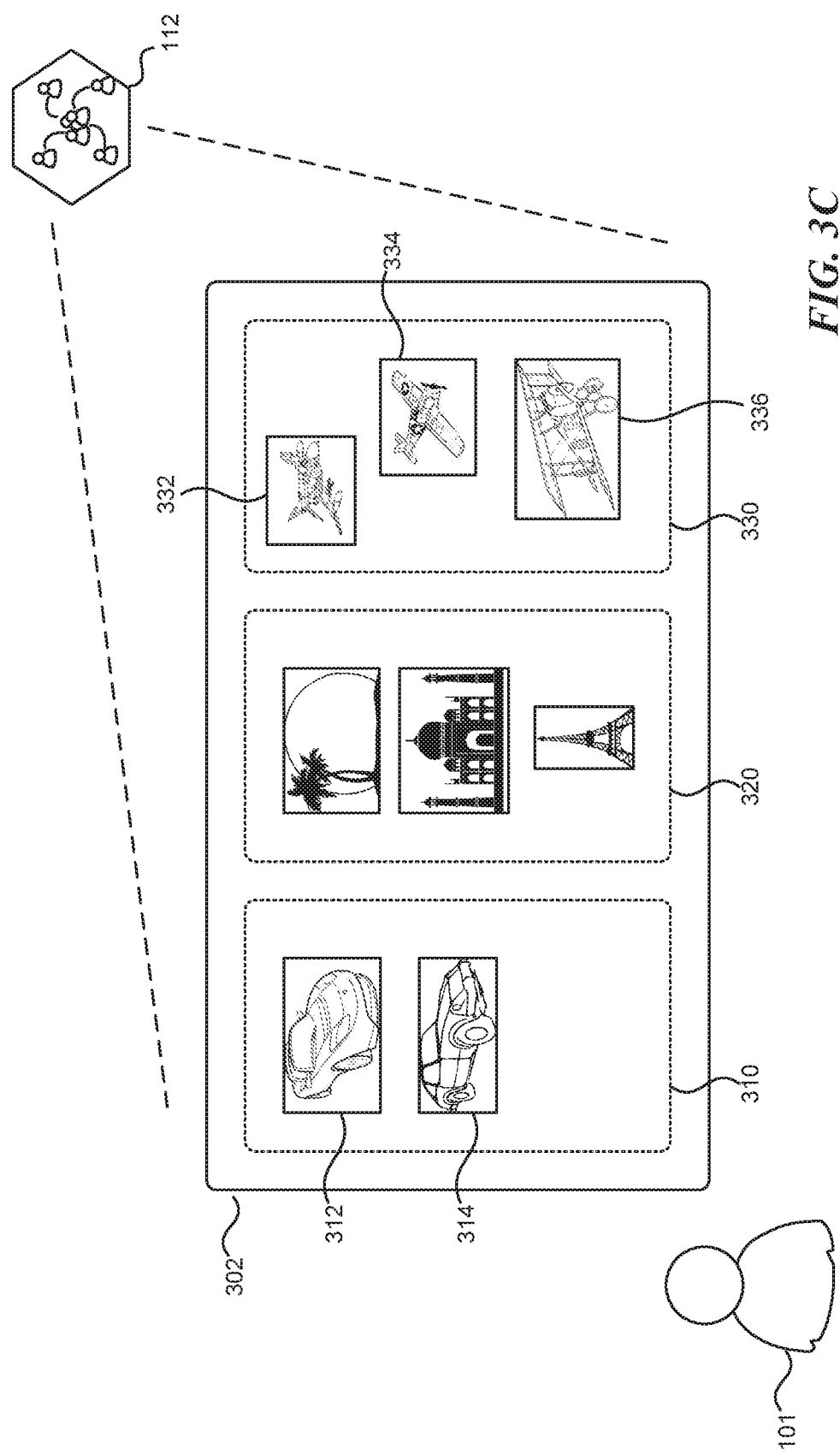

Turning to FIG. 2 and FIGS. 3A-3C, FIG. 2 is a flow diagram illustrating an exemplary routine 200 for generating additional content for a user in that user's content space based on discovered information from the user's email account, according to aspects of the disclosed subject matter. FIGS. 3A-3C, referenced for illustration and exemplary purposes, are pictorial diagrams illustrating exemplary content in a user's content space 302 hosted by a social networking service 112, and updated with additional content items according to aspects of the disclosed subject matter.

For purposes of the example set forth in FIGS. 3A-3C, a social networking service 112 is shown as providing an online content space 302 for user/subscriber 101. At the beginning of routine 200 (i.e., before the analysis of the user's email account), the user's online content space 302 includes two content collections, collections 310 and 320. In this example, content collection 310 includes content relating to fancy cars and includes two content items 312 and 314 regarding this particular collection topic/theme. Content collection 320 includes content relating to travel locations and includes three content items 322, 324 and 326 regarding this collection topic.

In regard to routine 200, beginning at block 202, a typical first step is to obtain user authorization to access the user's email account. In one embodiment, this authorization comes in response to a request from the social networking service to gain access to the user's email account. The user authorization typically includes at least the email address of the user as well as access information. According to various embodiments, the access information may include information regarding a service that is authorized to provide the email items of the user to the service. A token or passkey indicative of user authorization may be included in the access information for validating and/or authorizing the routine's access of the user's email items to the providing service. Utilizing a third-party service (i.e., third-party to the routine processing the email) may result in greater security to the user by surfacing only those API (application programming interface) calls that respond with the requested information (email items), rather than the actual items themselves. By way of illustration, the user may maintain a "gmail" or "outlook" email address such that the social networking service would need to reach out to the corresponding email address provider, typically via an API, to gain access to the various email items.

Regarding the notion of obtaining user authorization, it should be appreciated that this user authorization is obtained through clear notice and with full consent of the user. According to various embodiments of the disclosed subject matter, the user is fully informed and provides clear consent for accessing the user's email items.

Of course, in an alternative embodiment, the access information may include the password or other unlocking key for accessing the email account directly. Additional information, such as domain, access port, server, email type (e.g., IMAP, POP3, Exchange), and the like may also be obtained from the user. In regard to this additional access information, in addition to information obtained from the user, standard or default information corresponding to the particular email account may be used, and custom information also may be obtained from the email's domain/provider itself.

After obtaining email access information, at block 204, the email account of the user is accessed. More particularly and according to aspects of the disclosed subject matter, email items from the inbox (a collection of email items that have been sent to the user) and outbox (a collection of email items that have been sent from the user) are accessed. Moreover, any subfolders or other containers (including subfolders within the inbox and/or outbox) that contain email items are typically accessed. Further still, in addition to email items, items corresponding to tasks, calendar and scheduling, notes, and the like may also be accessed and evaluated. Accordingly, while this document generally refers to email items, it should be understood that this general reference may include these other forms of content. Moreover, in addition to content items (both received and sent items) that may be accessed, SMS/MMS (short message service/multimedia message service) content, chatbot content, and other sources of communications that are sent and/or received by the user may also be accessed.

With the email items of the email account now available, at block 206 an iteration loop is begun. As those skilled in the art will appreciate, this iteration loop iterates through each of the email items of the email account, processing each one of the email items according to the processing steps set forth herein. For purposes of clarity, the currently iterated email item (the email item that is currently being processed in the course of iterating through the email items) will be referred to as the "email item" or as the "currently iterated email item."

At block 208, and in regard to the currently iterated email item, one or more topics of that email item are identified. By way of definition, a "topic" of an email item typically corresponds to an entity (e.g., person or organization), a concept, a theme, sentiment or prevailing notion within the email. In some embodiments, in addition to or as an alternative to a topic, a user preference and/or sentiment may be identified. For example, an analysis of an email item may result in the identification of a "fancy car" topic, and further indicate that the user has a negative preference/dislike for 1970's era cars. Having both a topic (which may, of itself, infer a user preference) as well as a clear user preference to the topic will lead to more accurately personalizing the user experience, including adding content to an existing content collection of the user. Sentiment refers to the user's feeling or sense of a particular item. A sentiment may be a positive or negative sentiment towards a particular topic (leading to a positive or negative preference.) However, a sentiment may be further nuanced beyond simply reflecting a positive or negative feeling toward a particular object. A sentiment may include a sense of aspiration, interest, distaste, and the like. For example, an analysis or review of an email item may identify a topic as well as a desire to achieve or purchase an item of that topic.

As suggested above and according to aspects of the disclosed subject matter, there may be one or more topics (or preferences) identified within each email item, though it may be common to identify only a single topic for any given email item. Of course, in some instances it may be that there is no identifiable topic or user preference in which case the email item may be ignored and/or not processed.

According to aspects of the disclosed subject matter, the identification of the one or more topics of the currently iterated email item may be made according to a lexical analysis of the email item. The application of heuristics and algorithms, in the course of the lexical analysis, may be made to identify document frequency of terms and phrases, inverse document frequency of terms and phrases, key terms of any subject line, or terms and/or phrases of areas indicating emphasis. The analysis may be, alternatively or additionally, made according to template information, with templates determined according to an originating domain of the email item. In some instances, a template identifies a form or structure of an email, along with context for interpreting the subject matter within key or important fields/areas of the email. Utilizing domain-specific templates may improve the identification of key terms and phrases from other content in an email item. For example, an email item (in an inbox) originating from a known travel service may trigger the use of a template for efficiently looking into the subject matter/content of the email item to identify key terms such as location, dates, etc. The templates, themselves, may be indictors of a topic or theme of the email item. Lexical analyses and domain-specific templates may be used in conjunction with each other to identify topics of an email item. In yet another alternative or additional processing mode, a machine learning model may be used to evaluate the email item to identify one or more topics with corresponding likelihoods of accuracy.

Closely related to templates is the utilization of structured data. Structured data includes certain data arrangements (tables, columns, tabbed, etc.), tagged data (e.g., XML and/or HTML tags), quoted content, emphasized content (e.g., bold, underline, strikeout, size, capitalization, etc.), and the like. Often, just as with templates, detecting the source/originator of the structured content can lead to better understanding the structured data. For example, knowing that an email item is a confirmation receipt regarding a purchase from a known seller, information such as the purchased item, the cost of the purchased item, color of the purchased item, and the like may be identified among the structured data. Accordingly, information regarding structured data and data source may be used in identifying one or more topics (and/or user preferences) from an email item. Of course, even understanding that some item has been purchased can lead to a user preference. Indeed and by way of illustrative example, through an analysis of the user's email items, the social networking service can begin to understand what items the user has in his/her closet, understand the user's tastes with regard to fashion, and can correspondingly make decisions on adding content to an existing content collection (or create a new content collection) for the user, as well as updating preferences regarding the user. Indeed, even existing content collections may be rearranged based on learned user preferences from the processed email items, and preferences (positive and/or negative) for various items, topics, etc.

In addition to identifying one or more topics, through the various analyses conducted on the currently iterated email item to identify one or more topics, a determination of additional factors or criteria may also be made. These factors and/or criteria include a strength of a given topic to the user as well as a sentiment of the user with regard to the topic. In regard to the strength of the topic to the user, this refers to how strongly this topic relates to or is applicable to the user (irrespective of whether it is a positive or negative evocation of emotion/reaction). With regard to the strength of the topic, an email item may strongly indicate a particular topic (e.g., gardening) but the user may actually dislike gardening. Knowing that a topic does not strongly relate to a user is important in determining whether to automatically generate content for the user in regard to topics of interest. Determinations as to strength may be derived from how much the user seems to be involved with a given topic, the predominance of the topic in the email item, words and phrases that indicate emphasis, emotion, exclamation and the like.

While the content/subject matter of the email item is analyzed to identify topics, preferences, and/or sentiments, many email items include references to other content (i.e., hyperlinks, etc.) that may provide key information in processing the email to identify any topics. By way of illustration and not limitation, a currently processed email item may include a link (e.g., a hyperlink, URI, and/or URL) to additional content. A review and analysis of the additional content, in conjunction with the currently iterated email item, may provide context, meaning, and/or additional information that may be critical to understanding topics and sentiments, as well as the user's own strength of relationship to that particular topic. Accordingly, in various embodiments of the disclosed subject matter, references to content external to the email item are explored and analyzed in conjunction with the currently iterated email item to help identify any topic or preference, or user sentiment, of the email item.

In a similar manner to external content links, one email item may be part of a thread or chain of email items, or reference another email item of the user that, in conjunction with the currently iterated email item, provide context and information regarding one or more topics, preferences, and sentiments, as well as the strength of these topics, preferences, and sentiments to the user. According to aspects of the disclosed subject matter, simple iteration of email items may be altered such that an email item which belongs to a thread or chain of email items may be analyzed in view of the entire thread or chain of email items. Moreover, email items that are not part of any given thread or chain, but referenced within a currently iterated email item, may also be explored and evaluated in conjunction with the currently iterated email item.

In addition to determining a likely relationship strength of an email topic, as suggested above a sentiment value may also be determined. This sentiment value is an estimation of whether the user favors or disfavors the particular topic. In conjunction with the strength of the topic, determinations of whether to auto-generate content for the user in the user's online content space are made. The sentiment value is made according to an analysis of the email item and relevant terms and phrases, the structure of the email item with regard to the relevant terms and phrases (viewed as being positive or negative), the brevity or verbosity of the content, existing user preferences, whether the user originated or received the message, and the like.

At block 210, the one or more identified topics, along with any strength or sentiment criteria with regard to the one or more topics, are used to update, or potentially update, the user's preferences as maintained by the social networking service. As suggested above, it may be that a topic of an email item, in view of the strength and sentiment of the topic to the user, should be interpreted as a user preference. In one embodiment, the information regarding the one or more topics is provided to a preference manager (often implemented as an executing machine learning model) that makes determinations about the subject matter to potentially infer new preferences of the user, update existing preferences, or simply record the information as user data as the basis of making further enhancements or revisions to the user's preferences maintained by the social networking service.

At block 212, a determination is made as to whether to add system-identified content to a content collection in the user's online content space. This determination is made according to an evaluation based on the identified topic, the strength and sentiment of the user to the topic (as available), as well as user preferences regarding the topic. According to one or more embodiments and by way of illustration and not limitation, scores may be associated with each of the one or more topics, adjusted according to corresponding other criteria (e.g., strength and sentiment), such that each topic of the currently iterated email item is assigned an aggregate score. If the aggregate score for any given topic meets or exceeds a threshold amount, the determination is made to add system-identified content, corresponding to that topic, to the user's online content space.

If the determination is made to not add content to the user's online content space, the routine 200 proceeds to block 226, where the routine either selects a next email item to process or terminates the iteration loop. Alternatively, if the determination is to add content to the user's online content space, the routine 200 proceeds to block 214. At block 214, an item of content related to at least one of the one or more topics is identified. At block 216, a determination is made as to whether to add the identified item of content to an existing content collection of the user, or whether to add the identified item of content to a to-be-created content collection. In one embodiment and according to aspects of the disclosed subject matter, this determination may be made according to a topic or theme of existing content collections in view of the topics/themes of the user's content collections such that if there is a match or near-match, the item of content is added to an existing content collection. Additionally, in the event that all or some of the content items of a content collection are visual in nature, e.g., images and/or video, visual processing may be employed to identify similarities and differences between existing content and any newly identified content for addition to the user's content collections. More particularly, visual processing can be used to understand the taste or preference of a particular user. For example and by way of illustration and not limitation, in the event that a user receives one or more email items that include visual images of gray, mid-century modern couches, a visual processing and analysis of such content may lead the system to identify these attributes of those couches (gray, mid-century, etc.) as being of interest to the user, and the basis for identifying other content with similar features, as well as preferences, topics, sentiments, and the like. In contrast, if there is no match or near-match, the identified item of content is added to a new content collection.

If the determination is to add the content item to an existing content collection, the routine 200 proceeds to block 222 where an existing content collection is selected according to the one or more topics, user preferences, strength of topic to the user, and sentiment of the user. At block 224, the identified item of content is added to the existing content collection.

With regard to FIG. 3B, in this example it is assumed that the determination was to add the system-identified content 316 (a fancy truck) to the existing content collection 310 (relating to fancy cars). In this example, the effort to match may have been considered a "near-match" and, based on one or more user preference's, the determination may have led to an expanded interpretation of the theme of the collection, in this case to suggest that a preference for fancy cars includes fancy pick-up trucks.

Alternatively, if the determination is to add a new content collection to the user's online content space 302, at block 218 a new content with a theme/topic is added, such as content collection 330 of FIG. 3C. At block 220, the identified content item (or content items in the event that multiple items have been identified) is added to the newly created content collection for the user. With regard to FIG. 3C, the newly created content collection 330 includes newly added content items 332, 334 and 336, relating to a topic/theme of airplanes throughout history. After posting the new item (or new items) of content to the newly created content collection, the routine 200 proceeds to block 226.

In addition to adding to an existing content collection or creating a new content collection, yet another option may be to rearrange one or more content collections based on information learned about the user. For example, in processing the user's email items it may be learned that the user has a particular affinity and preference to German-made vehicles, including both cars and motorcycles. Thus, at block 216, in addition to or as an alternative to creating or adding to a content collection, elements of existing content collections may be re-arranged according to user preferences, as well as including one or more additional items of content for the collection.

At block 226, if there are additional email items to process, the routine 200 continues the iteration by returning to block 206 where a next email item is selected as the currently iterated email item. Alternatively, if all of the email items of the email account have been processed, the routine 200 terminates.

Regarding the determination to add content items to a content collection (either existing or new content collections), while routine 200 illustrates that this determination is made in conjunction with processing the email items of the email account, in fact this is illustrative of just one embodiment. In an alternative embodiment, the determination to add content items to a content collection of the user may be made after all email items of the email account have been processed. In this manner, the user's preferences may have been fully updated according to the insight and information learned through processing the email items, and the user's preferences may then be leveraged to determine if any items of content should be added to the user's content space, what items of content should be added (assuming it is determined that content items should be add items), and whether to create new content collections or add content to existing content collections.

In addition to identifying user preferences from email items, advantageously the system may be further utilized to discover items/articles that the user possesses, items/articles that the user aspires to possess, and items/articles that the user does not wish to possess. One example of this is in discovering what is in the user's wardrobe through email item evaluation. For example and by way of illustration and not limitation, in evaluating an email item it may be determined that at least one topic of the email item is in regard to the purchase of various items, such as blazer, suit, or new pair of shoes. Through analysis of the email item as well as cross-referencing with content that may be known about the various items, the system may be able to identify that the user now owns a camel hair blazer, or pair of high-heeled shoes. This knowledge/information about the user, including information that may be contained in the user's wardrobe, may be used in identifying additional content that may be presented to the user, such as a pair of slacks that would coordinate well with the purchased blazer. Indeed, discovering at least some of the items in the user's wardrobe may lead to presenting the user with information that would complement those items, or in understanding a particular style or preference of the user. As the system determines whether or not to add items of content to a content collection for the user, consideration may be given to what is in the user's wardrobe, what would combine well with those items, and create a content collection that contains both items that the user already possesses as well as items that would coordinate well with those items. The identification of related items may be achieved through visual processing of representative images of items that are known to be in the user's wardrobe. Additionally or alternatively, manually curated collections of wardrobe items may be referenced to identify what is viewed as being complementary with a given item owned/possessed by the user. Vendors may also be consulted for suggestions regarding complimentary, coordinating items. Further still, curated content collections of a large corpus of users that include one or more wardrobe items owned by the user may be consulted to identify what is popular and/or stylish with that corpus of user. Visual processing and/or recognition may be used to automatically distill information from content collections, including a curated content collection of one large bodies of users, regarding complimentary and/or coordinative relationships between items. The result of one or more of these, as well as other analyses, may be used to identify additional content for presentation to the user.

Figure 4:
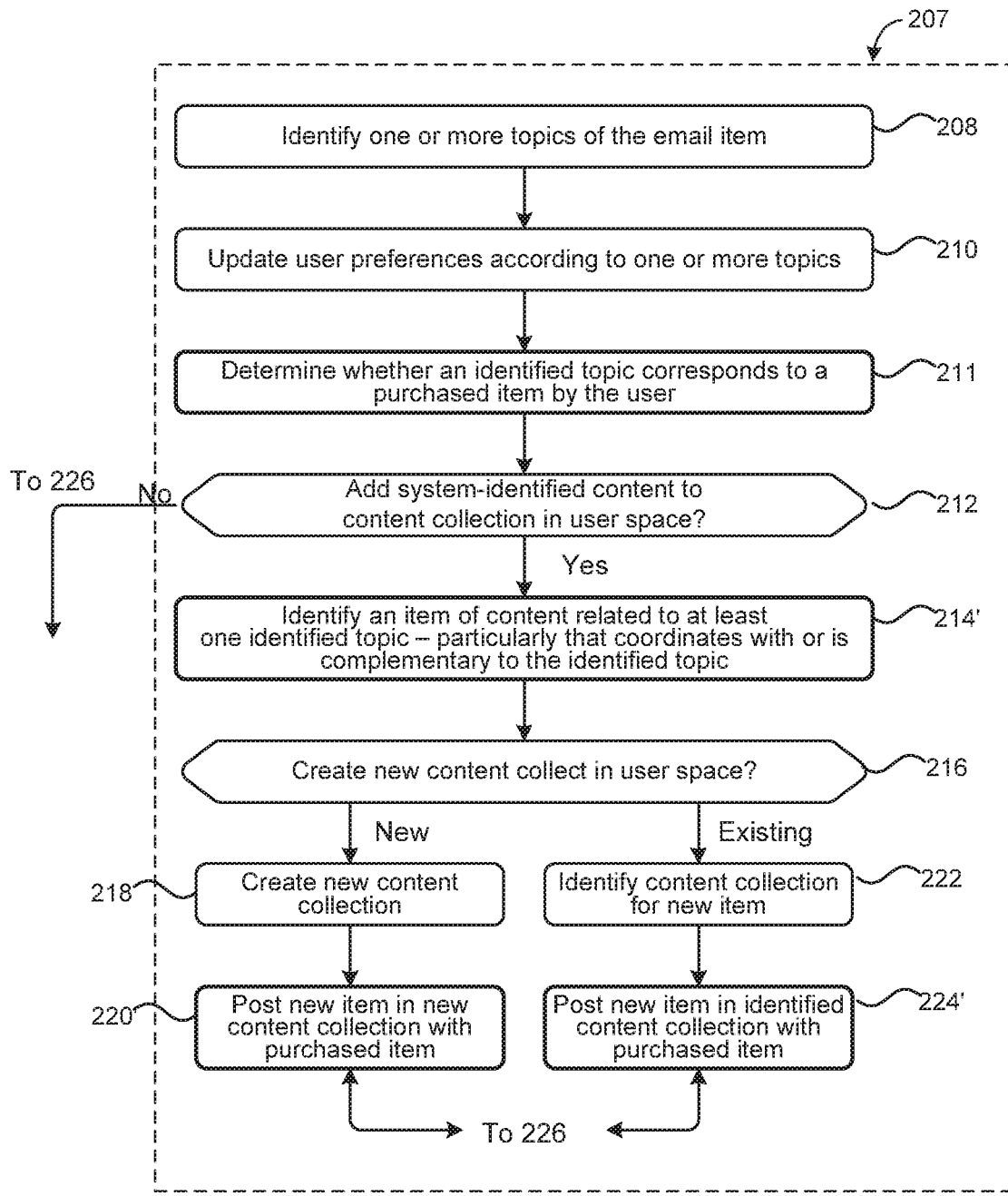
FIG. 4 is a flow diagram illustrating an exemplary portion of the routine of FIG. 2, particularly in regard to identifying an item of purchase and presenting the item and related content to the user.

While routine 200 may be applied in many circumstances, for illustration purposes one particular application of the routine is in regard to assisting a user with regard to identifying items that correspond to the user's own items, particularly the user's wardrobe. Box 207 of FIG. 4 illustrates a particular section of routine 200 that is applied to this particular scenario. As discussed above in regard to FIG. 2, at block 208, one or more topics of that email item are identified. As already suggested, at least one of these topics may correspond to an item that the user has purchased, particularly a wardrobe item of the user, such as (for illustration purposes) a pair of slacks. At block 210, the user's preferences are updated according to the one or more topics identified of the currently iterated email item.

While not shown in FIG. 2, in this further detailed description, at block 211 a determination is made as to whether an identified topic corresponds to a purchased item of the user, e.g., the exemplary pair of slacks mentioned above. At block 212, the determination is made as to whether to add system-identified content to a content collection in the user's online content space, or to create a new content collection for the user. After making the determination, at block 214', an item of content related to at least one of the one or more topics is identified. In this example, the identified item of content is one that coordinates with and/or is complimentary to the identified item (e.g., the user's pair of slacks).

At block 216 and based on the determination of block 212, a content collection is created or identified for additions. In both cases, as shown in blocks 220 and 224', the identified item of content is added (e.g., an image of the identified item) along with the purchased item of content.

While this particular application of the elements (as illustrated in block 207) from routine 200 is directed to presenting the user with the purchased wardrobe item and a complimentary/coordinating item that the user may wish also to purchase or simply see as a potential complimentary/coordinating item, the exemplary routine 200 may be applied to other scenarios for providing the user with useful, new information. These scenarios include, by way of illustration and not limitation, presenting the user with items in which he has indicated is a hobby, has a professional interest, or has a social or religious interest, and the like.

In regard to routine 200 described above, as well as other routines and/or processes described or suggested throughout this document, while these routines and/or processes are expressed in regard to discrete steps, these steps should be viewed as being logical in nature and may or may not correspond to any specific, actual and/or discrete execution steps of a given implementation. Also, as already indicated above, the order in which these steps are presented in the various routines and processes, unless otherwise indicated, should not be construed as the only order that they can be executed, or even the best order in which the steps may be carried out. Moreover, in some instances, some of these steps may be combined and/or omitted. Those skilled in the art will recognize that the logical presentation of steps is sufficiently instructive to carry out aspects of the claimed subject matter irrespective of any particular development or coding language in which the logical instructions/steps are encoded.

Of course, while the described routines and/or processes include various novel features of the disclosed subject matter, other steps or processing features may also be included and carried out in the execution of the subject matter set forth in these routines. Those skilled in the art will appreciate that the logical steps of these routines may be combined together or be comprised of multiple steps. Steps of the above-described routines may be carried out in parallel or in series. Often, but not exclusively, the functionality of the various routines is embodied in software (e.g., applications, system services, libraries, and the like) that is executed on one or more processors of computing devices or computing systems, such as the computing system described in regard to FIG. 6 below. Additionally, in various embodiments all or some of the various routines and/or processes may also be embodied in executable hardware modules including, but not limited to, systems on chips (SoC's), codecs, specially designed processors and or logic circuits, and the like.

As suggested above, these routines and/or processes are typically embodied within executable code blocks and/or modules comprising routines, functions, looping structures, selectors and switches, such as if-then and if-then-else statements, assignments, arithmetic computations, and the like. In execution, the execution of the various elements configures a computing device or system to operate in accordance with the routines/processes disclosed herein. However, the exact implementation in executable statements of each of the routines is based on various implementation configurations and decisions, including programming languages, compilers, target processors, operating environments, and the linking or binding operation. Those skilled in the art will readily appreciate that the logical steps identified in these routines may be implemented in any number of ways and that the logical descriptions set forth above are sufficiently enabling to achieve similar results.

While many novel aspects of the disclosed subject matter are expressed in routines or processes embodied within applications (also referred to as computer programs), apps (small, generally single or narrow purposed applications), services and/or methods, these aspects may also be embodied as computer executable instructions stored by computer-readable media, also referred to as computer-readable storage media, which are articles of manufacture. As those skilled in the art will recognize, computer-readable media can host, store and/or reproduce computer-executable instructions and data for later retrieval and/or execution. When the computer-executable instructions that are hosted or stored on the computer-readable storage devices are executed by a processor of a computing device or system, the execution thereof causes, configures and/or adapts the executing computing device to carry out various steps, methods and/or functionality, including those steps, methods, and routines described above in regard to the various illustrated routines and/or processes. Examples of computer-readable media include, but are not limited to: optical storage media such as Blu-ray discs, digital video discs (DVDs), compact discs (CDs), optical disc cartridges, and the like; magnetic storage media including hard disk drives, floppy disks, magnetic tape, and the like; memory storage devices such as random-access memory (RAM), read-only memory (ROM), memory cards, thumb drives, and the like; cloud storage (i.e., an online storage service); and the like. While computer-readable media may reproduce and/or cause to deliver the computer-executable instructions and data to a computing device or computing system for execution by one or more processors via various transmission means and mediums, including carrier waves and/or propagated signals, for purposes of this disclosure computer-readable media expressly excludes carrier waves and/or propagated signals.

Figure 5:
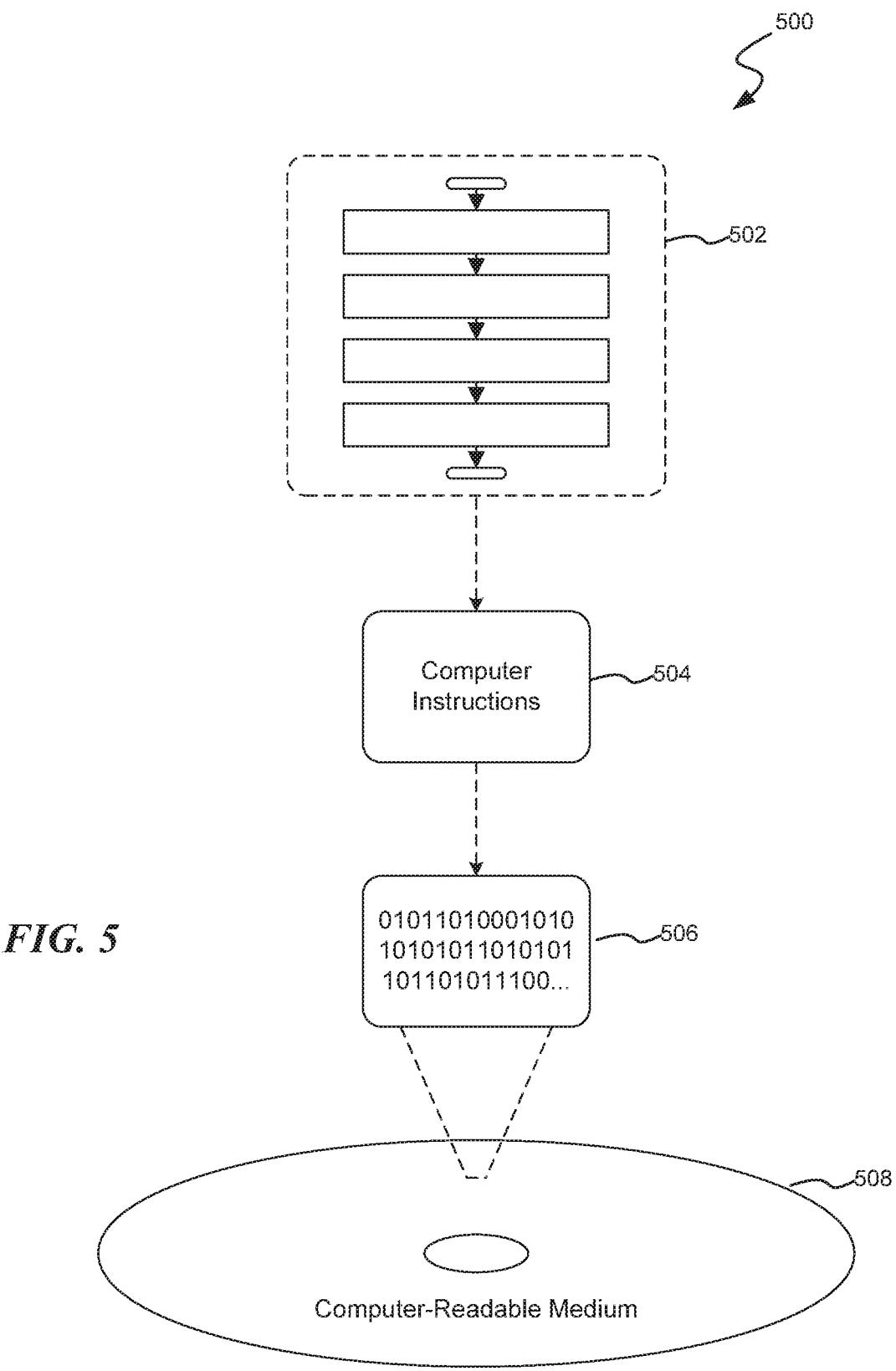
FIG. 5 is a block diagram illustrating an exemplary computer readable medium encoded with instructions for generating additional content in a user's content space according to aspects of the disclosed subject matter.

Regarding computer-readable media, FIG. 5 is a block diagram illustrating an exemplary computer-readable medium encoded with instructions for generating content in a user's online content space, as described in regard to routine 200 of FIG. 2. More particularly, the implementation 500 comprises a computer-readable medium 508 (e.g., a CD-R, DVD-R or a platter of a hard disk drive), on which is encoded computer-readable data 506. This computer-readable data 506 in turn comprises a set of computer instructions 504 configured to operate according to one or more of the principles set forth herein. In one such embodiment 502, the processor-executable instructions 404 may be configured to perform a method, such as at least some of exemplary routine 200, for example. In another such embodiment, the processor-executable instructions 504 may be configured to implement a system on a computing device, such as at least some of the exemplary, executable components of computing system 500 of FIG. 5, as described below. Many such computer-readable media may be devised, by those of ordinary skill in the art, which are configured to operate in accordance with the techniques presented herein.

Figure 6:
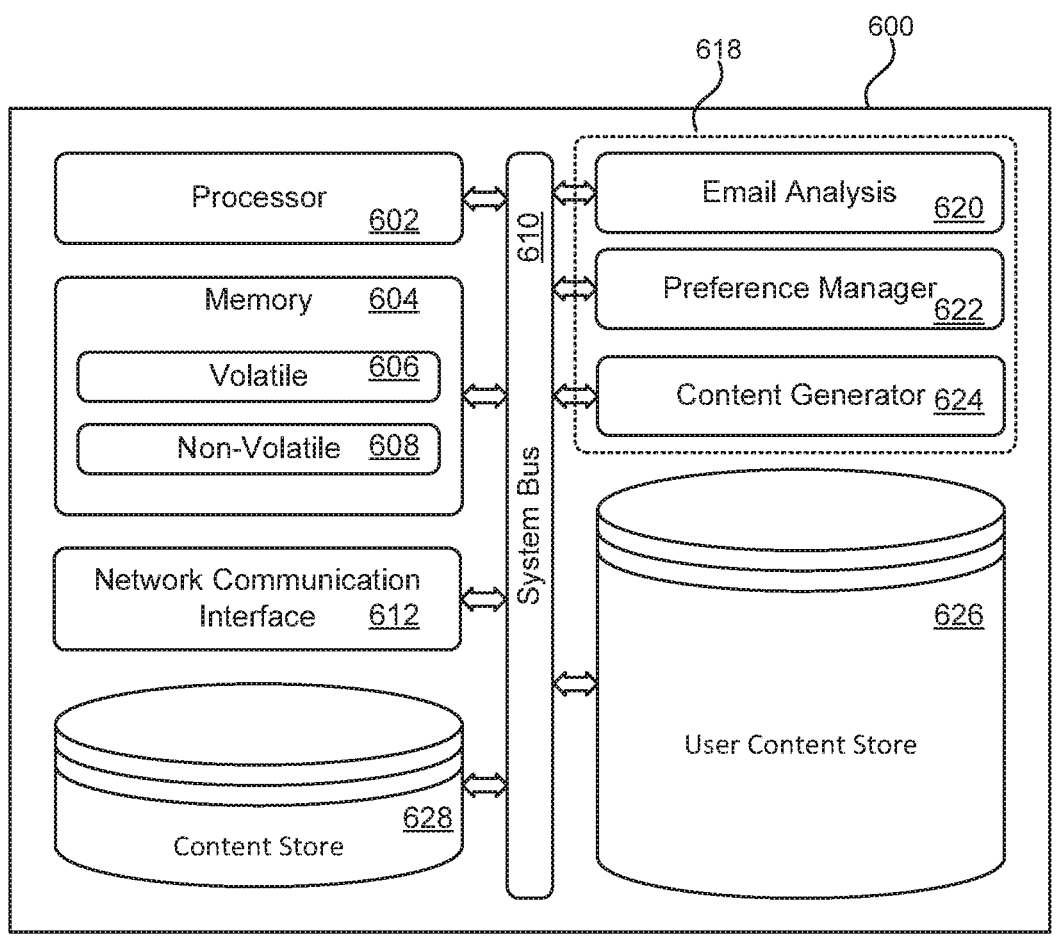
FIG. 6 is a block diagram illustrating an exemplary computing device suitable for implementing aspects of the disclosed subject matter.

Turning to FIG. 6, FIG. 6 is a block diagram illustrating an exemplary computing system 600 suitable for implementing aspects of the disclosed subject matter, particularly in regard to a social networking service 112 auto-generating content in a user's online content space according to information from examining the user's email account. The computing system 600 typically includes one or more processors (or processing units), such as processor 602, and further includes at least one memory 604. The processor 602 and memory 604, as well as other components of the computing system, are interconnected by way of a system bus 610.

As will be appreciated by those skilled in the art, the processor 602 executes instructions retrieved from the memory 604, from computer-readable media, such as computer-readable media 500 of FIG. 5, and/or other executable components in carrying out the various functions of a social networking service 112 particularly configured to auto-generate content in a user's online content space. The processor 602 may be comprised of any of a number of available processors such as single-processor, multi-processor, single-core units, and multi-core units, which are well known in the art.

As will be further appreciated by those skilled in the art, the memory 604 typically (but not always) comprises both volatile memory 606 and non-volatile memory 608. Volatile memory 606 retains or stores information so long as the memory is supplied with power. In contrast, non-volatile memory 508 is capable of storing (or persisting) information even when a power supply is not available. Generally speaking, RAM and CPU cache memory are examples of volatile memory 606 whereas ROM, solid-state memory devices, memory storage devices, and/or memory cards are examples of non-volatile memory 608.

Further still, the illustrated computing system 600 typically also includes a network communication interface 612 for interconnecting this computing system with other devices, computers and/or services over a computer network, such as network 108 of FIG. 1. The network communication interface 612, sometimes referred to as a network interface card or NIC, communicates over a network using one or more communication protocols via a physical/tangible (e.g., wired, optical fiber, etc.) connection, a wireless connection such as WiFi or Bluetooth communication protocols, NFC, or a combination thereof. As will be readily appreciated by those skilled in the art, a network communication interface, such as network communication component 612, is typically comprised of hardware and/or firmware components (and may also include or comprise executable software components) that transmit and receive digital and/or analog signals over a transmission medium (i.e., the network.)

The exemplary computing system 600 includes one or more components that, in execution on the computing system, provide an online social networking service, such as social networking service 112 of FIG. 1. These one or more components, as outlined by box 518, include but are not limited to, an email analysis component 620, a preference manager component 622, and a content generator 624.

Upon obtaining permission to access an email account of a user/subscriber of the social networking service and account information, and in execution on the computing system 600, the email analysis component 620 accesses and processes the email items of the user's email account. As described above in regard to blocks 206 and 208 of FIG. 2, the email analysis component 620 iterates through the items of the email account and, for each of the items, conducts an analysis of the email item to identify one or more topics of the email item. In addition to identifying the one or more topics, additional email item information may be also determined, including an indication of the strength of each of the one or more topics to the user, and an indication of sentiment (e.g., a positive sentiment, a negative sentiment, or a neutral sentiment) of the user in regard to the particular topic.

Based on the information from the email analysis component 620, the social networking service 112 updates (or potentially updates) that user's preferences by way of a preference manager 622. According to aspects of the disclosed subject matter, the user's preferences may be updated based on the frequency in which a particular topic is referenced by the user, including the number of email items that touch on the subject. Additionally, a user's preferences may be updated, modified or expanded based on previously established user preferences, the preferences of other users, user behaviors, and the like. According to aspects of the disclosed subject matter, the preference manager 622 may utilize a machine learning model that, based on the input gained from the analysis of the various email items, determines a likelihood of a variety of preference modifications or additions for the user and, for those likelihoods that meet or exceed a predetermined threshold, updates or adds to the user's preferences.

A content generator 624, in execution, is used to determine whether to add content to a content collection in the user's online content space based on the information obtained from the email items by the email analysis component 620 and preferences maintained (or updated) by the preference manager 622. As described above in regard to blocks 212-224, the content generator 624 makes a determination as to whether to add content to a content collection in the user's content space (as maintained in a user content store 626), identifies an item content from a content store 626, as well as determines whether to add the item of content to an existing content collection or to create a new content collection for the user.

Regarding these various components of the illustrated computing system 600, those skilled in the art will appreciate that many of these components may be implemented as executable software modules stored in the memory of the computing device, as executable hardware modules and/or components (including SoCs—systems on a chip), or a combination thereof. Indeed, components may be implemented according to various executable embodiments including executable software modules that carry out one or more logical elements of the processes described in this document, or as hardware and/or firmware components that include executable logic to carry out the one or more logical elements of the processes described in this document. Examples of these executable hardware components include, by way of illustration and not limitation, ROM (read-only memory) devices, programmable logic array (PLA) devices, PROM (programmable read-only memory) devices, EPROM (erasable PROM) devices, and the like, each of which may be encoded with instructions and/or logic which, in execution, carry out the functions and features described herein.

While various novel aspects of the disclosed subject matter have been described, it should be appreciated that these aspects are exemplary and should not be construed as limiting. Variations and alterations to the various aspects may be made without departing from the scope of the disclosed subject matter.

What is claimed:

1. A computer implemented method for generating content for a
   user of a social networking service, the method comprising:
   under the control of a processor executing instructions of the social networking service:
   obtaining user authorization for accessing an email account of the user of an external email service remotely located to the social networking service;
   gaining access to the email account of the user through execution of instructions by the processor utilizing an application programming interface (API) of the external email service over a computer network;
   accessing a plurality of email items of the user over the computer network through the execution of executable instructions by the processor via a plurality of calls to the API, wherein the API provides requested information over the computer network to the social networking service in response to the plurality of calls to the API without providing the plurality of email items;
   for each of the plurality of email items:
   executing instructions by the processor that carry out a first analysis of the requested information associated with the email item to identify a topic of the email item;
   determining, based at least in part on the first analysis, a strength value corresponding to the identified topic;
   providing email information regarding the email item and the identified topic to a preference engine as information regarding the user, wherein the preference engine includes a trained machine learning model trained to be provided user information associated with the user as an input and, based at least in part on the user information, at least one of:
   determine a new preference of the user; or
   update an existing preference of the user;
   determining, based at least in part on the strength value, a first score for the identified topic for providing content to a content space of the user maintained by the social networking service; and
   upon a determination that the first score at least meets a threshold to provide content to the content space of the user:
   identifying an item of content that coordinates with or is complimentary to the identified topic; and
   posting representative content of the identified item of content to
   an identified content collection of the content space of the user maintained by the social networking service.

2. The computer implemented method of claim 1, wherein obtaining user authorization for accessing the email account of the user comprises obtaining user account information.

3. The computer implemented method of claim 1, wherein each email item comprises one or more items of communication.

4. The computer implemented method of claim 1, wherein the first analysis of the email item to identify the topic of the email item further comprises, at least:
   identifying an originating domain of the email item;
   selecting a predetermined template for identifying the topic of the email item corresponding to the originating domain of the email item, the predetermined template comprising a set of executable rules for identifying the topic of the email item; and
   executing a set of rules of the selected, predetermined template by the processor in regard to the email item, the execution resulting in the identification of the topic of the email item.

5. The computer implemented method of claim 1, wherein the first analysis of the email item to identify a topic of the email item further comprises, at least, conducting a lexical analysis of elements of the email item to identify key terms of the email item, the analysis resulting in the identification of the topic of the email item.

6. The computer implemented method of claim 1, further comprising:
   identifying a plurality of topics of the email item according to the first analysis of the email item;
   determining a corresponding score for at least one topic of the plurality of topics of the email item; and
   determining that the corresponding score for the at least one topic at least meets the threshold.

7. The computer implemented method of claim 6, further comprising
   identifying a second item of content related to the at least one topic of the plurality of identified topics.

8. The computer implemented method of claim 1, wherein determining the first score for the identified topic for providing content to the content space of the user further comprises:
   determining an importance value of the identified topic to the user, the importance value indicating a likelihood of importance of the identified topic to the user; and
   wherein the first score of the identified topic is further determined, at least in part, on the importance value of the identified topic to the user.

9. The computer implemented method of claim 8, wherein determining
   the first score for the identified topic for providing content to the content space of the user further comprises:
   determining a user-preference of the identified topic to the user; and
   wherein the first score of the identified topic is further determined, at least in part, according to the user-preference of the identified topic to the user.

10. The computer implemented method of claim 1, wherein the identified content collection is identified by identifying an existing content collection in the content space of the user.

11. The computer implemented method of claim 1, wherein the identified content collection is identified by creating a new content collection in the content space of the user, the new content collection being the identified content collection.

12. The computer implemented method of claim 1, further comprising determining that a first email item is associated with a related email item, wherein the related email item is an email referenced by the first email item and the first analysis is further performed on the related email item.

13. The computer implemented method of claim 1, wherein the plurality of email items includes at least one of:
   a task item;
   a calendar item;
   a note;
   a short message service content item;
   a multimedia message service content item; or
   an email received by the user from another party.

14. A computer readable medium bearing computer executable instructions which, when executed on a computing system comprising at least a processor, carry out a method of generating content to a content space of a user of a social networking service,
   the method comprising:
   obtaining user authorization for accessing an email account of the user of the social networking service from an external email service associated with the user and remotely located to the social networking service;
   gaining access to the email account of the user on the external email service through execution of instructions by the processor utilizing an application programming interface (API)
   of the external email service over a computer network;
   accessing, via a plurality of calls to the API, a first email item of the email account of the user over the network through the execution of executable instruction by the processor, wherein the API provides requested information over the computer network to the social networking service in response to the plurality of calls to the API without providing the first email item;
   executing instructions by the processor that carry out a first analysis of requested information associated with the first email item to identify a topic of the first email item;
   executing instructions by the processor that determine, based at least in part on the first analysis, a strength value corresponding to the identified topic;
   providing email information regarding the first email item and the identified topic to a preference engine as information regarding the user, wherein the preference engine includes a trained machine learning model trained to be provided user information associated with the user as an input and, based at least in part on the user information, at least one of:
   determine a new preference of the user; or
   update an existing preference of the user;
   executing instructions by the processor that determine, based at least in part on the strength value, a first score for providing content to a content space of the user maintained by the social networking service; and
   upon a determination that the first score at least meets a threshold to provide content to the content space of the user according to the identified topic:
   identifying an item of content related to the identified topic; and
   posting the identified item of content to the content space of the user maintained by the social networking service.

15. The computer readable medium of claim 14, wherein identifying the topic of the first email item according to the first analysis of the first email item further comprises, at least:
   selecting a predetermined template for identifying the topic of the first email item corresponding to an originating domain of the first email item, the predetermined template comprising a set of executable rules for identifying the topic of the first email item; and
   executing the set of rules of the selected, predetermined template in regard to the first email item, wherein the application of the set of rules results in the identification of the topic of the first email item.

16. The computer readable medium of claim 14, wherein identifying the topic of the first email item according to the first analysis of the first email item further comprises determining, based on the first analysis of the first email item, a purchased item by the user.

17. The computer readable medium of claim 14, wherein identifying the item of content related to the identified topic comprises identifying an item of content that coordinates with or is complimentary to the identified topic.

18. The computer readable medium of claim 14, wherein determining the first score for the identified topic for providing content to the content space of the user comprises:
   determining an importance value of the identified topic to the user, the importance value indicating a likelihood of importance of the topic to the user;
   wherein the first score is further determined, at least in part, according to the importance value of the identified topic to the user.

19. A computer system for generating content to a content space of a user of a social networking service, the system comprising a processor and a memory,
   wherein the processor executes instructions stored in the memory to configure the computer system to at least:
   receive authorization from the user to access email items of an email account of the user hosted by a hosting email service external to the social networking service, the authorization including at least email account information and a key for accessing the email items of the email account of the user, wherein the hosting email service is communicatively accessible to the social networking service over a computer network;

gain access to the email account of the user through execution of computer-executable instructions by the processor utilizing an application programming interface (API) of the external email service over the computer network;

access, via a plurality of calls to the API, a first email item of the accessed email account of the user over the network through the execution of computer-executable instructions by the processor, wherein the API provides requested information over the computer network to the social networking service in response to the plurality of calls to the API without providing the first email item;

execute computer-executable instructions by the processor to carry out an analysis of requested information associated with the first email item to identify a topic of the first email item, wherein the analysis is conducted by a machine learning model trained to receive at least a portion of requested information associated with the first email item as an input and determine the topic;

execute computer-executable instructions by the processor to determine, based at least in part on the first analysis, a strength value corresponding to the identified topic;

provide email information regarding the first email item and the identified topic to a preference engine as information regarding the user, wherein the preference engine includes a trained machine learning model trained to be provided user information associated with the user as an input and, based at least in part on the user information, at least one of:

determine a new preference of the user; or update an existing preference of the user;

execute computer-executable instructions by the processor to determine, based at least in part on the first analysis, a first score for the identified topic for providing content to a content space of the user; and upon a determination that the first score at least meets a predetermined threshold to provide the content to the content space of the user:

identify an item of content related to the identified topic; and post the identified item of content to the content space of the user maintained by the social networking service.

20. The computer system of claim 19, wherein a content generation module is configured to:

determine to post the identified item of content to a new collection of content in the content space of the user; and upon determining to post the identified item of content to a new collection of content in the content space of the user:

creating a new collection of content in the content space of the user; and posting the identified item of content to the new collection of content in the content space of the user.

\* \* \* \* \*